United States Patent [19]
Griffith

[11] 4,433,217
[45] Feb. 21, 1984

[54] HAND CONTROLLER MULTIPLE CIRCUIT SWITCH

[75] Inventor: William M. Griffith, Menlo Park, Calif.

[73] Assignee: Koala Technologies Corporation, Santa Clara, Calif.

[21] Appl. No.: 408,328

[22] Filed: Aug. 16, 1982

[51] Int. Cl.³ .................. H01H 13/70; H01H 3/00; H01H 25/00; A63F 7/06

[52] U.S. Cl. .................. 200/5 R; 200/5 A; 200/6 A; 200/17 R

[58] Field of Search ............ 200/5 R, 5 A, 6 A, 17 R, 200/153 K, 159 B, 292, 275, 157; 235/85 R, 85 G, DIG. 28

[56] References Cited

U.S. PATENT DOCUMENTS

| | | | |
|---|---|---|---|
| 4,246,452 | 1/1981 | Chandler | 200/5 A |
| 4,301,337 | 11/1981 | Eventoff | 84/DIG. 7 |
| 4,319,099 | 3/1982 | Asher | 200/275 X |
| 4,349,708 | 9/1982 | Asher | 200/17 R X |

Primary Examiner—J. R. Scott

Attorney, Agent, or Firm—Alan H. MacPherson; Thomas S. MacDonald

[57] ABSTRACT

A hand controller for use in controlling the motion of a cursor on a video display comprises a spherical surface on which is mounted a flat plate. On the bottom of the flat plate is a unique electrical switch capable of indicating the direction in which the flat plate is rocked over the spherical surface. Attached to the bottom of the flat plate adjacent the spherical surface is a spring consisting of a substantially flat center portion and four spiralling arms extending from the periphery of said center portion to attach to the structure on which the spherical surface is mounted. When the flat plate is rocked over said spherical surface, the spring generates a restoring force which, upon removal of the rocking force, restores the flat plate to its nominal position. The spring makes possible rocking motion of the flat plate over the spherical surface without pinning the flat plate to a point on the spherical surface. In one embodiment, the controller is capable of moving the cursor in eight different directions.

6 Claims, 9 Drawing Figures

FIG. 3
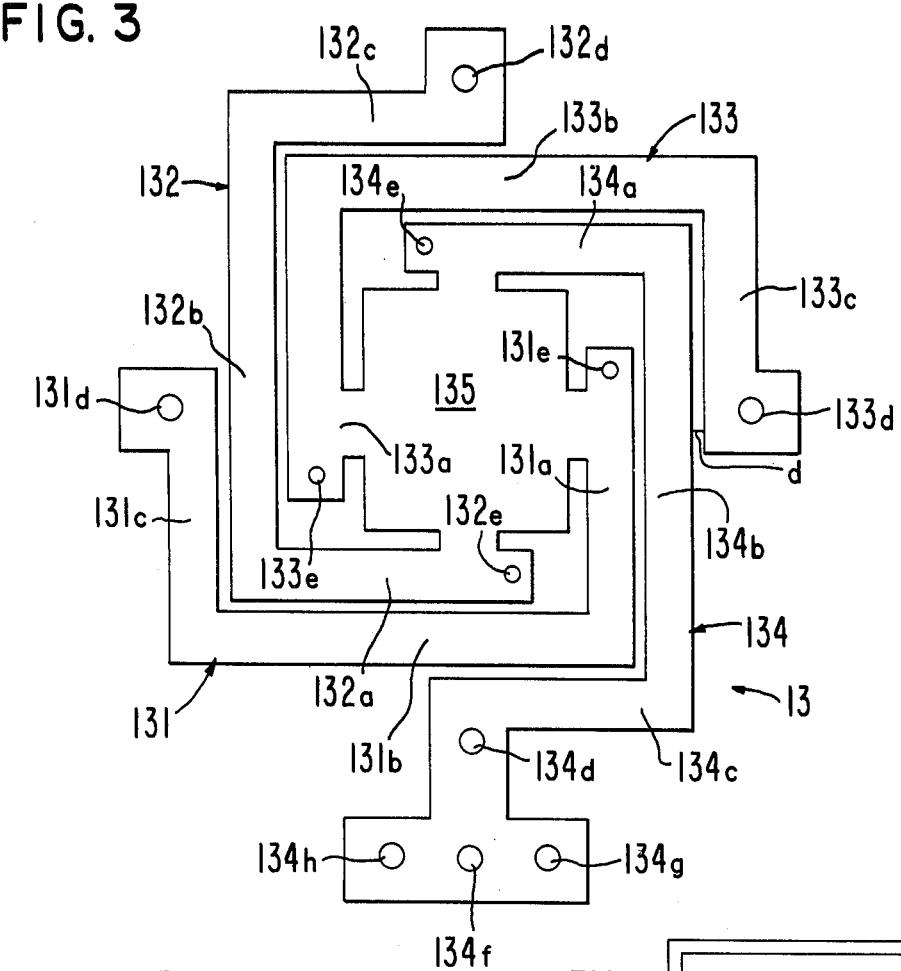
FIG. 4A
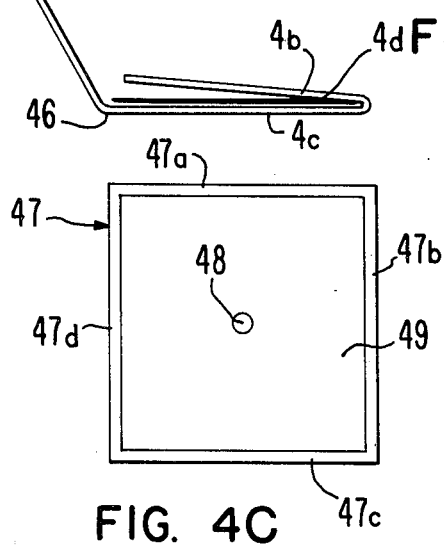
FIG. 4C
FIG. 4B
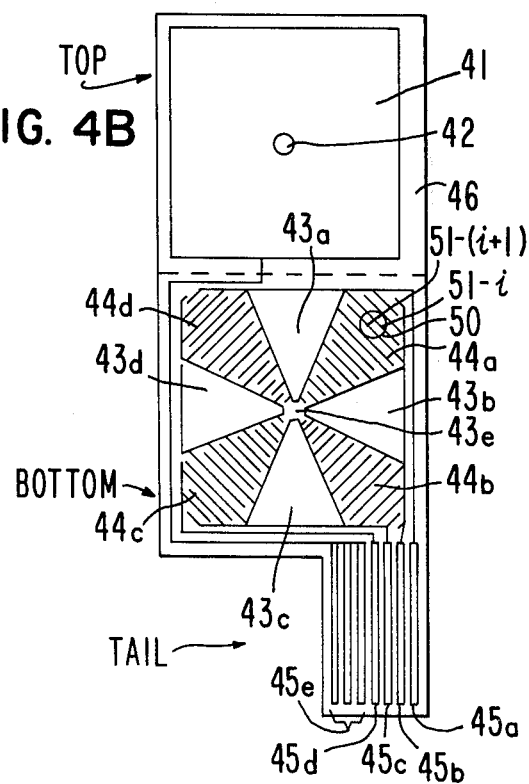

HAND CONTROLLER MULTIPLE CIRCUIT SWITCH

BACKGROUND OF THE INVENTION

1. Field of the Invention

This invention relates to a hand-held controller suitable for use to control the motion of a cursor on a cathode ray tube or similar display, and in particular to a hand-held controller capable of replacing the prior art joy stick commonly used with television video games.

2. Prior Art

Television games are quite common. A number of patents describe such games (see, for example, U.S. Pat. No. 4,095,791 on an invention of Smith and Talesfore; and U.S. design Pat. Nos. DES247755, DES247754 and DES248470, all describing video games or hand controllers suitable for use with such games). A typical controller for use with a video game is disclosed in U.S. Pat. No. 4,085,301 on an invention of Smith. This controller contains a plurality of mechanical parts together with a number of switches capable of responding to commands in at least six degrees of freedom. This controller, similar to other controllers, is relatively complicated mechanically and, therefore, is expensive to manufacture.

SUMMARY OF THE INVENTION

This invention overcomes many of the disadvantages associated with the prior art joy sticks and similar controllers associated with video games and more generally, with the control of cursors on video displays. In accordance with this invention, a hand-held controller is provided for use with video displays such as used in video games, which is simple to construct, contains a minimal number of moving components and is rugged, thereby to withstand the rough use to which hand controllers are often put. The controller of this invention utilizes a portion of a spherical surface over which a flat plate is movably placed, thereby to enable the user to rock the flat plate over the portion of the spherical surface thereby to actuate switches selectively placed on the spherical surface or on the flat plate. As a particular advantage of this invention, the flat plate is arranged relative to the spherical surface so as to rock over the surface without sliding, slipping or scuffing thereby to eliminate wear caused by friction.

In accordance with a unique feature of this invention, in the absence of use a unique spring mechanism restores the flat plate to its nominal position regardless of the direction in which the plate has been rocked.

In accordance with this invention, the unique spring comprises a selected number of approximately C shaped spring portions, one end of each C being fixed to the center portion of the flat plate substantially above the spherical surface. The other end of each C is fixed to the rigid frame of the bottom part of the controller on which the spherical surface is mounted. In one embodiment using four such C-shaped spring members, each member is oriented 90° relative to the two adjacent C-shaped spring members and the portion of each C-shaped spring member attached to the flat plate is nested inside the concave portion of one adjacent C-shaped spring.

In use, depressing the flat plate distorts the C-shaped springs generating a force which, when the distortion force is removed, restores the flat plate to its given position. However, by pressing on the flat plate, contact is made to any one of a selected number of switches formed in actuating relationship to the spherical surface, thereby to provide an electrical signal to move the cursor on the cathode ray tube in a selected direction.

In accordance with this invention, a hand-movable switch is also mounted along one edge of the hand controller to allow the user to simultaneously carry out certain operations on the displayed information while moving the cursor. In a video game, this last switch can, for example, comprise the firing switch. Thus, rotation of the flat plate on the sphere provides positional information to the system while activation of the peripheral switch or switches provides marking information to the system.

As an added advantage of this invention, a portion of the spring structure is, in one embodiment, replaced with a miniature touch tablet which thereby allows an infinite number of different positions to be indicated on the display by the cursor. The touch tablet, for example, can be an X-Y sensitive pressure plate of the type disclosed in U.S. Pat. No. 4,214,122 issued July 22, 1980, for example. Use of such a touch tablet removes the need for switches in the spherical surface or elsewhere.

This invention will be more fully understood in conjunction with the following detailed description taken together with the attached drawings.

DESCRIPTION OF THE DRAWINGS

FIG. 3 comprises a top view of the unique spring mechanism of this invention;

FIG. 4A is a side view of the circuit switch used in this invention;

FIG. 4B is a folded-out plan view of the circuitry of the switch of FIG. 4A;

FIG. 4C is a plan view of the spacer seen in FIG. 4A;

DETAILED DESCRIPTION

Figure 1:
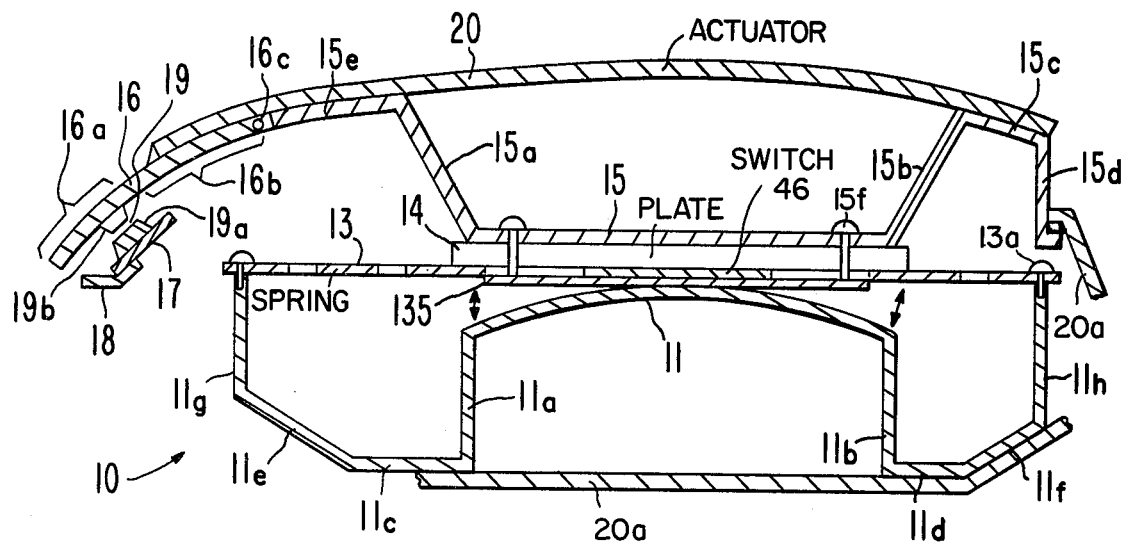
FIG. 1 is a cross-sectional view of a major portion of the hand-held controller of this invention.

The interior structural portion of the hand-held controller 10 of this invention is illustrated in cross section in FIG. 1. In FIG. 1 spherical surface 11 (preferably formed of a non-conductive plastic although any other appropriate material, conductive or non-conductive, could be used) is supported by an annular support structure of which portions 11a and 11b are shown in cross section. It should be understood that portions 11a and 11b merely form different parts of the same annular-shaped structure supporting spherical surface 11. Supports 11a and 11b are integrally formed with bottom plates 11c and 11d which abut the bottom 20a of the controller casing. Extensions 11e and 11f from bottom plates 11c and 11d, respectively, support flanges 11g and 11h which hold spring portions 13. Spring 13 is shown in more detail in top view in FIG. 3.

On top of spring 13 (FIG. 1) is mounted flat plate 14. As will be shown later in the description of FIG. 3, flat plate 14 is mounted onto center portion 135 (FIG. 3) of spring 13. Although center portion 135 of spring 13 is shown slightly below the C-shaped portions of spring 13 for illustrative convenience, in practice, center portion 135 of spring 13 will be in the same plane as the outer portion of spring 13.

An additional flat plate 15 is mounted on flat plate 14. Extensions 15a, 15b of flat plate 15 (preferably integrally formed therewith) support the top portion 20 of the hand-held controller of this invention. As will be seen shortly, portion 15 of the hand-held controller is capable of being rocked over portions of the top of the spherical surface 11 as indicated by arrows so as to activate switches 111-1, 111-3 et al thereby controlling the position of a cursor visible in a well-known manner on a video display. Extensions 15a and 15b of flat plate 15 in turn support contoured top pieces 15c and 15e. A depending number 15d closes off the gap within controller bottom 20a. A hinge 16c then attaches rotatable member 16 to the periphery of the hand-held controller. On the inner surface of extension 16a of portion 16 is formed a switch button 19b which, when portion 16a of rotatable peripheral member 16 is pressed, contacts surface 19a of switch 19 thereby to make electrical contact and provide, in a well-known manner, a marking signal to the system. Contact 19a is mounted upon support member 17. Support member 17 is mounted upon support 18 which is rigidly attached to an extended portion (not shown) of the frame 15e.

Figure 2:
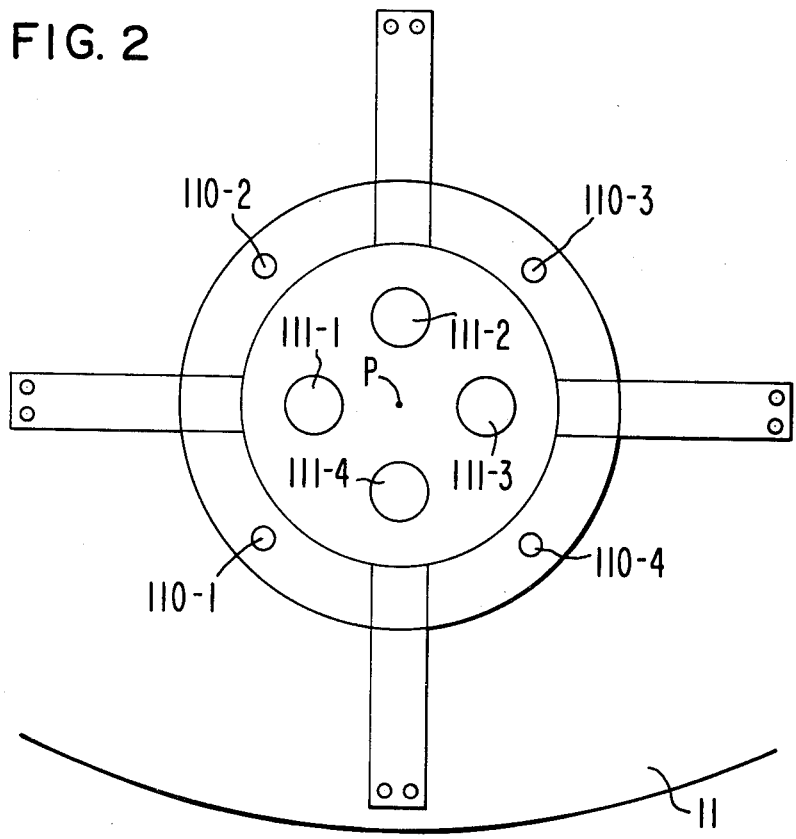
FIG. 2 comprises a top view of a spherical portion contained in the bottom portion of the hand-held controller illustrated in FIG. 1 showing one possible arrangement of printed circuit switches on the spherical surface.

Spherical surface 11 is shown in top view in FIG. 2. Switches are placed in the system in several different ways. In one embodiment, switches are actually mounted in openings in the top of spherical surface 11 such as openings 110-1 through 110-4 formed equispaced about an annular ring substantially in the middle portion of the spherical surface 11 and also in openings 111-1 through 111-4 formed equispaced about a more inner portion of the surface 11. Each of switches 111-1 through 111-4 is mounted on a radius from the center "P" of spherical surface 11 oriented 90° from the radii on which are mounted the two adjacent switches 111. Each of switches 110-1 through 110-4 is likewise mounted on a radius from the center "P" of spherical surface 11 oriented 90° apart from the radii on which are mounted the two adjacent switches 110 and is angularly offset 45° from the radii on which are mounted the two adjacent switches 111. Thus, a switch is mounted every 45° around the spherical surface 11.

Alternatively, the switches 110 and 111 can be mounted in the bottom surface of the center portion 135 (FIGS. 1 and 3) of spring 13. Then small protrusions or bumps can be formed in the top of spherical surface 11 to contact these switches when center portion 135 is appropriately rocked over spherical surface 11, thereby allowing the switches to be activated with a slight movement of plate 14.

While eight switches are shown mounted in spherical surface 11 in FIG. 2, it should be understood that any number of switches compatible with the structural limitations of the hand controller and the control resolution desired can be mounted in the top surface of spherical surface 11.

In the preferred embodiment, the top surface of spherical portion 11 remains passive and the switches are mounted in the bottom of plate 14 and activated by the contact of spring portion 135 with the top surface of spherical portion 11.

Figure 5:
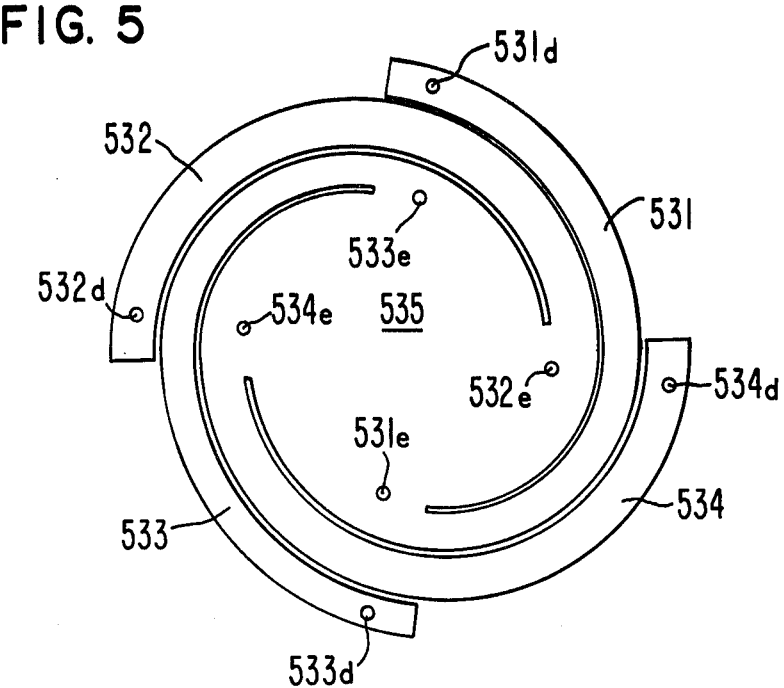
FIGS. 5 and 6 are plan views of alternative embodiments of the spring of this invention.

One embodiment of the unique spring of this invention is illustrated in top view in FIG. 3. Spring 13 comprises four C-shaped arms 131, 132, 133 and 134 attached to a center portion 135. While each C-shaped arm is squared off as shown, a more circular C-shaped structure can also be used as illustrated in FIG. 5. Center portion 135 of the spring is preferably square but can also be rectangular or circular in shape if desired. Center portion 135 is mounted to the bottom of plate 14 (FIG. 1) typically by adhesive. However, alternatively, spring 13 can be mounted to the bottom of plate 14 by means of rivets 15f or screws passed through holes 131e, 132e, 133e and 134e just adjacent to section 135 as shown.

Four C-shaped arms are permanently attached to center portion 135. Thus, arm 131 contains portion 131a which is permanently attached to section 135, portion 131b attached at substantially a right angle to portion 131a and portion 131c attached at another substantial right angle to portion 131b. Portions 131a, 131b and 131c together form a "C". Opening 131d is formed in the free end of portion 131c and is used to attach the spring to the bottom part of the substructure 11h or 11g of housing 10 as shown in FIG. 1. Arms 132, 133 and 134 each similarly have a portion labelled a, another portion labelled b, and another portion labelled c, together with an opening labelled d for joining each spring arm to a portion of the substructure 11g or 11h of the hand controller.

In use, the deflection of a portion of plate 14 downward toward spherical surface 11 by rocking plate 14 above the surface causes an opposite portion of plate 14 to rise from surface 11. Spring 13 is designed so that the proper portions of the spring are deflected down or up generating forces on plate 14 which restore plate 14 to its normal position upon the removal of the displacing force.

The spring 13 is unique in that it allows the plate 14 to rock about the surface 11 in any direction desired without slipping, sliding or scuffing of the plate 14 relative to surface 11 and without requiring the plate 14 to be center locked by means of a pin to the center portion "P" of spherical surface 11. This is achieved inherently with the geometry of the unique structure of the spring of this invention. Thus each C shaped arm 131, 132, 133, and 134, extends from one side of center portion 135 and then extends around the center portion 135 to be attached to the base plate as by rivets 13a at a position directly adjacent that side of center region 135 opposite the side from which the arm is attached to center portion 135. Thus, the attachment point of a given arm is on a line rotated approximately 180° from the direction in which the arm initially extends from plate 135. The four C-shaped spring arms allow plate 14 to be depressed in one region while raised in another region relative to surface 11 and the arms themselves can distort in the required directions to allow this movement. Spring 13 allows the user to deflect the plate 14 in any direction without generating a torque or rotational force on the plate 14 other than in direct opposition to the rocking movement about surface 11. Of interest, by making the spacing "d" between arms (illustrated between arms 133 and 134 in FIG. 3) sufficiently small (for example, 0.050"), the spring 13 prevents rotation of the top portion of housing 10 relative to the bottom portion of this housing because each arm 131, 132, 133 and 134 can rotate only 0.050" before abutting an adjacent arm.

Preferably spring 13 is made of a resilient plastic such as polycarbonite. However, spring 13 can be made of any appropriate material possessing the desired spring characteristics such as spring steel copper or beryllium.

The spring of this invention provides single member construction with horizontal, vertical and rotational stability. It also provides a pressure plate (center portion 135) for activating a sensor on an electronic touch tablet of a type well known in the art when the touch tablet is formed as the center portion of the spring. The spring member also provides pressure without relative motion between the pressure pad 14 and the sensor area thus preventing wear on the components. Spring 13 allows the pressure pad 14 attached to the top portion of the cursor control 10 to rock over the spherical surface 11 of the bottom portion of the controller 10 and thereby provides motion without wear.

FIGS. 4A, 4B, 4C and 4d illustrate one electrical switch means for producing electrical signals indicating the direction in which the cursor on the video display should move in response to motion of the top portion 15 of the hand controller 10 illustrated in FIG. 1 relative to spherical surface 11. FIG. 4A illustrates in side view the relationship of the components of the electrical switch shown in FIGS. 4B, 4C and 4d. In FIG. 4a, an insulating strip 46, preferably Mylar, has formed thereon a top portion 4b, a bottom portion 4C and a center portion 4d. The top portion 4b is illustrated in greater detail in FIG. 4B and comprises a portion of Mylar 46 on which has been formed a conductive silver material 41 (such as a conductive paint) in all regions except a center region 42, shown as circular in FIG. 4b. Of course, any other conductive material capable of adhering to Mylar can be used for this invention if desired. The bottom portion 4c of Mylar strip 46 has formed thereon a pattern as shown in FIG. 4B. Pattern 43a, formed of conductive paint such as conductive silver, is formed in a triangular shape with the base of the triangle 43a in contact with one side of substantially square bottom portion 4c. Additional triangular conductive portions 43b, 43c and 43d are formed abutting the periphery of each of the other three side walls of bottom portion 4c and comprise conductive portions 43b, 43c and 43d as illustrated. The four conductive triangles 43a through 43d extend toward a center portion 43e which is left non-conductive and merely comprises exposed Mylar. Extending from each of the conductive portions 43a through 43d are conductive fingers such as fingers 51-i and 51-(i+1). These conductive fingers are arranged in an interdigitated pattern such that the fingers from a given conductive region (such as conductive region 43a) extending toward an adjacent conductive region (such as conductive region 43b) alternate with the fingers extending from the adjacent conductive region (such as conductive region 43b) toward the given conductive region (such as conductive region 43a). Thus, conductive finger 51-i (part of which is illustrated in circled region 50) extends from conductive portion 43a or the electrical contact to portion 43a toward portion 43b. Finger 51-(i+1) extends from conductive portion 43b or its electrical contact toward conductive portion 43a.

Each conductive portion 43a through 43d is contacted by a corresponding one of conductive leads 45a through 45d, respectively. These conductive leads provide access to external circuitry which will operate upon the cursor on the video display in response to the signals generated by the device of this invention. In addition, conductive leads 45e (shown as three leads electrically connected together) are formed on Mylar 46 so as to electrically contact the conductive material 41 forming part of the top 4b of the structure.

Placed between the top 4b and the bottom 4c of the signal producing structure is the spacer structure shown in FIG. 4c. The spacer of FIG. 4c comprises a closed insulating ring 47, shown as substantially square to conform to the outer peripheries of bottom portion 4c and top portion 4b, consisting of four sides 47a, 47b, 47c and 47d. Ring 47 surrounds an air space 49 in the center of which is an insulating dot 48. Material 47 and 48 separates and electrically insulates the outer periphery of top 4b from the outer periphery of bottom 4c and electrically insulates the various contacts 43 and 51 formed on the inner surface of bottom portion 4c from the conductive material 41 formed on the inner surface of top 4b. Between the inner portion 48 of insulating material and the outer periphery 47 of insulating material is a sealed air space 49. Air space 49 is at sufficient pressure to keep electrically conductive material 41 on top 4b apart from the electrically conductive material 43 and 51 on the bottom 4c except when pressure is applied. Thus air space 49 allows the user, by pressing on the top plate 15 over the spherical surface 11, to bring a portion of conductive material 41 into electrical contact with a portion of the underlying conductive materials 43a, 43b, 43c, 43d or the interdigitated conductive leads 51-i et al. extending therefrom. The result is to force a particular portion of the bottom conductive material into contact with the top conductive material thereby sending an appropriate signal on a corresponding one or two of leads 45a through 45d indicating that these leads are at the potential of conductive material 41. Typically, this potential is ground. Electrical signals thus generated indicate the direction (within an angle of 45°) in which plate 15 has been rocked, and thus the direction in which the cursor on a video display should be moved. If desired, the cursor can be moved a distance proportional to the time the electrical contact so formed is maintained or the cursor can be moved a discrete distance with each contact.

Interdigitated lines 51-i and 51-(i+1) are spaced close enough together so that when the contact between plate 15 and spherical surface 11 is over an interdigitated region such as region 51, two adjacent interdigitated lines (such as lines 51-i and 51-(i+1)) are forced to contact top plate 41 thereby to produce signals on the leads connected to the two adjacent conductive regions such as regions 43a and 43b thus defining the quadrant in which contact has been made. In this way, the structure as shown will actually indicate eight different directions spaced apart by forty-five degrees (45°). Thus, a contact solely to the region above conductive paint 43a indicates that the cursor should move in the direction represented on the average by conductive region 43a. Likewise, a contact to the region between conductive region 43a and conductive region 43b indicates that the cursor should move in the average direction between conductive regions 43a and 43b. Accordingly, the structure shown in FIGS. 4A through 4C is capable of distinguishing between motion in eight different directions, each direction being rotated 45 degrees from the two directly adjacent directions.

The spring structure of this invention with the C-shaped arms can be fabricated in such a manner and from a material of such a thickness that the structure inherently prevents undesired horizontal, rotational and vertical motion of the top portion 20 of the controller relative to the bottom portion 20a of the controller. This is done by ensuring that the spacing between the partially nested C shaped spring members 131, 132, 133 and 134 (shown as spacing "d" in FIG. 3) is sufficiently small that a given C shaped member will block the movement toward it of the monolithic structure of which the C-shaped member is a part after only a very short travel. By the same mechanism, a rotational motion of the center portion 135 of the monolithic member will be stopped by one C shaped member abutting the directly adjacent C shaped member in which it partially nests before a substantial rotational displacement has occurred. Unwanted vertical movement is prevented by ensuring that the thickness of the monolithic spring structure is properly selected to give to the material a desired thickness.

Figure 6:
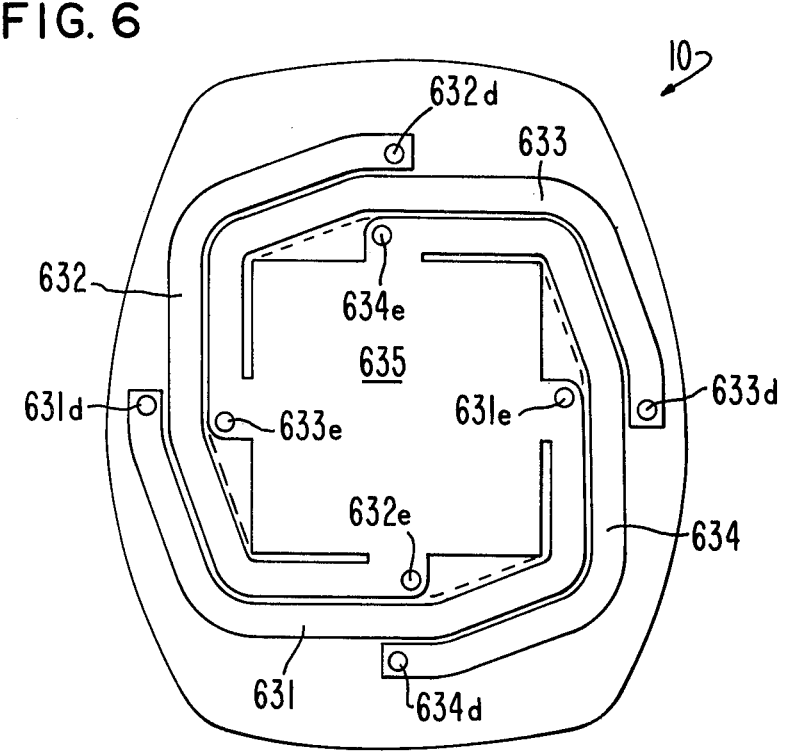

While the monolithic spring member of this invention has been described above in conjunction with FIG. 3 as containing four C shaped arms each protruding from one side of a four-sided center portion 135, center portion 135 can, if desired, be circular or polygonal in shape (as shown in FIGS. 5 and 6) and more than four arms can spiral out from the periphery of the center portion (such as portion 135 in FIG. 3, 535 in FIG. 5 and 635 in FIG. 6) if desired.

In addition to the switching structure described above, the spherical dome or surface 11, if desired, can have placed therein four switches on radii angled 90° apart from each other. These four switches can then be individually activated or activated in adjacent pairs to provide eight different signals to control the movement of the cursor in any one of eight different directions representing either one of the directions represented by one switch or the average of the direction between the two adjacent switches in one of the four possible sets of two adjacent switches.

It should also be noted that by using a conic as the base for the spherical surface 11, the rotation of the flat plate 14 is automatically stopped at the point where the flat plate 14 comes into contact with and tangent to the conic. Thus, the conic acts as an automatic stop on the rotation of the flat plate 14.

Figure 7:
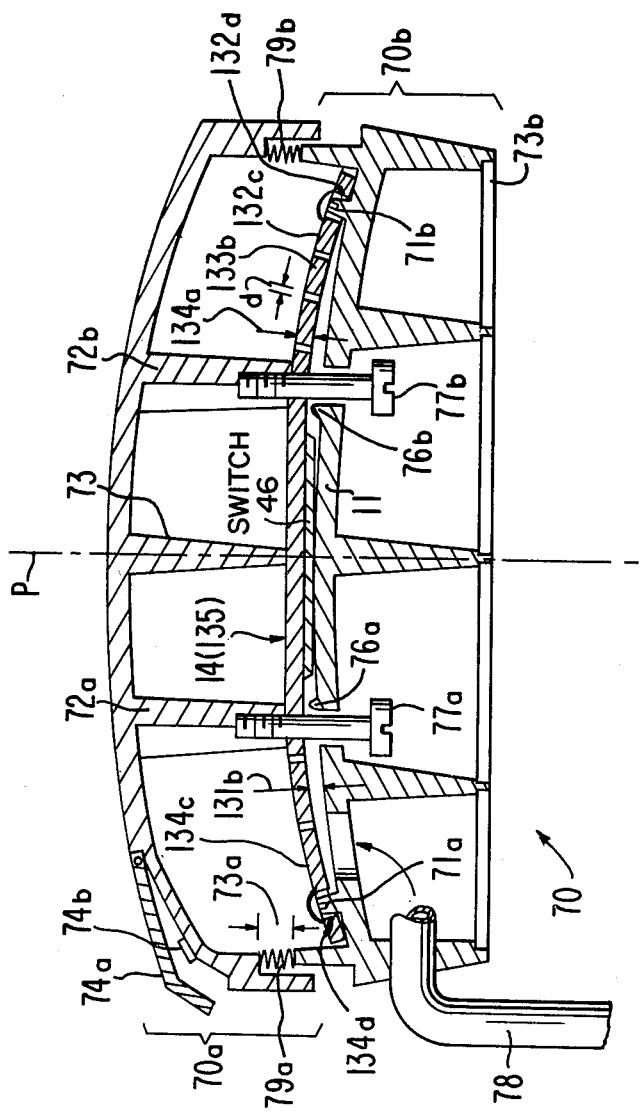
FIG. 7 is a cross-sectional side view of an alternative embodiment of a housing and spring support for the controller of this invention.

FIG. 7 illustrates in cross-section an alternative structure for the controller shown in cross-section in FIG. 1. This alternative structure uses the spider spring 13 shown in FIG. 3, for example, as an integral part of the bottom 14 (135) of the top portion 70a of the controller 70. The bottom portion has formed as an integral part thereof spherical surface 11 with stops formed as an annular ring 76 around the outer rim of the top portion of spherical surface 11. Cross-section 76a and 76b of this annular stop are shown in FIG. 7. The base 70b has formed therein posts 71a and 71b for receipt of the openings 134d and 132d respectively in arms 134 and 132 of spider spring 13 (FIG. 3). A screw (not shown) can then be threaded into each of posts 71a and 71b to hold firmly in place arms 134 and 132. The openings 131d and 133d of spider spring 13 (FIG. 3) are similarly secured to two additional posts formed as an integral part of bottom 70b of the controller 70 but not shown in the cross-section of FIG. 7.

The center portion 135 of spring 13 is secured to posts 72a and 72b of top portion 70a of the controller by screws 77a and 77b. These screws are well known "limit" screws capable of allowing the top portion 70a to move relative to the bottom portion 70b and even be separated therefrom by a small distance before arresting such separation. Typically the posts 72a and 72b in which these screws are inserted are an integral part of the webbing structure of the top portion.

The space "d" shown between adjacent portions of arms 134a and 133b limits the rotational motion or torque motion about vertical axis P of top 70a relative to bottom 70b. Center posts or "egg crate web" 73 supports the center of the center portion 135 of spider spring 13.

A flexible bellows 79a, 79b is attached to the peripheries of bottom 70b and top 70a to provide a dust seal thereby to maintain the inside of the controller dust free. The cable 78 is inserted through an opening in the base and makes electrical contact to the switching elements contained within controller 70 in a manner well known in the art. Bottom plate 73b likewise helps seal the hand controller from dust.

The keys for actuating corresponding to the keys 16a and switches 19a and 19b (FIG. 1) are shown in the structure of FIG. 7 as comprising pivotable member 74a and switch 74b mounted as shown on the outer portion of the housing of top portion 70a. Gross limit stops 73a prevent the top portion 70a and the bottom portion 70b from moving excessively beyond the limits set by annular stop 76a, 76b on spherical portions 11.

The structure illustrated in FIG. 7 is particularly adapted to be formed using a plastic molding process.

The above description of embodiments of this invention is intended to be illustrative and not limiting. Other embodiments of this invention will be obvious to those skilled in the art in view of the above disclosure. In particular, while four "C" shaped spring members are shown as part of the unique spring of this invention, a different number (for example, three or more) of these "C" shaped members can be used if appropriate.

I claim:

1. An electrical switch for use in a hand controller for use in controlling the motion of a cursor on a video display, wherein said hand controller includes a first portion containing a portion of a spherical surface convexly mounted thereon and a second portion containing a flat surface over a part thereof, said first and second portions being arranged so that said flat surface on said second portion is capable of being rocked over said portion of a spherical surface on said first portion, and includes deflectible spring means extending between said first and second portions for restoring said first and second portions to their nominal positions in the absence of a disturbing force applied thereto;

wherein said electrical switch means is mounted on the bottom of said flat plate between said flat plate and said portion of a spherical surface and wherein said electrical switch means comprises:

a top portion attached to said flat plate, said top portion comprising a substantially flat sheet of insulative material containing thereon a first electrically conductive surface at all points on the side not facing said flat plate except a portion in the middle thereof at said nominal positions of said first and second portions;

a bottom portion beneath said top portion containing thereon on the side facing said top portion a second electrically conductive surface, wherein said second electrically conductive surface has an outer periphery of substantially the same shape as the outer periphery of said first electrically conductive surface and wherein said second electrically conductive surface is arranged to lie directly beneath said first electrically conductive surface, and further wherein said second electrically conductive surface contains four triangular-shaped portions, the base of each triangular shaped portion abutting a selected portion of the periphery of said bottom portion and the sides of each triangular shaped portion intersecting said periphery such that each triangular-shaped portion is electrically separated from the two adjacent triangular-shaped portions; and wherein said second electrically conductive surface includes:

selected conductive fingers extending from each of said sides of said triangular-shaped portions toward but not in contact with the two adjacent triangular-shaped portions such that the fingers extending from one triangular-shaped portion to an adjacent triangular-shaped portion are interdigitated with the fingers extending from the adjacent triangular-shaped portion to the one triangular-shaped portion; and an annular band of insulative material separating the outer periphery of said first electrically conductive surface from said second electrically conductive surface with an air space formed between said first electrically conductive surface and said second electrically conductive surface such that said first electrically conductive surface is not in contact with said second electrically conductive surface except in response to rocking pressure applied to said flat plate, whereby rocking movement of said flat plate and resultant contact with said spherical surface between said first and second electrically conductive surfaces activates the switch means at that position.

2. Structure as in claim 1 including a conductive lead attached to said first electrically conductive surface and a separate conductive lead attached to each of said triangular shaped portions on said bottom portion.

3. Structure as in claim 2 including an insulative dot of material formed in the centers of said bottom portion and said top portion thereby to electrically separate the centers of said top portion and said bottom portion.

4. Structure as in claim 3 wherein said first and said second electrically conductive surface comprise a conductive silver and said top portion and said bottom portion each comprises a Mylar base on which is formed said conductive silver.

5. Structure as in claim 1 wherein said interdigitated fingers extending from the triangular-shaped portions are sufficiently close that when the top portion is pressed against the bottom portion over said interdigitated fingers, two adjacent fingers are in simultaneous electrical contact with said first electrically conductive surface on said top portion thereby to provide an electrical signal indicative of the position of pressure applied to said switch and thus indicative of the direction in which a cursor on a video display should move.

6. Structure as in claim 1, 2, 3, 4 or 5 wherein the peripheries of said top portion and said bottom portion are square and the base of each triangular shaped conductive portion abuts one side of said square.

* * * * *